S. H. DICKERSON.
Earth-Augers.
No. 5,508.
Reissued July 29, 1873.
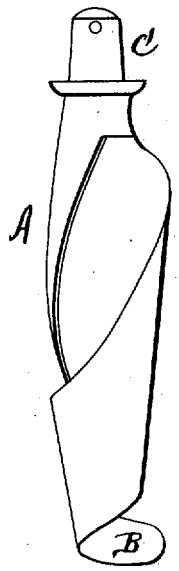
Witnesses:
Henry N. Miller
C. L. Monsch
S. H. Dickerson Inventor
by Standen Mason
Attorneys.
AM. PHOTO-LITHOGRAPHIC CO. N.Y. (OSBORNE'S PROCESS)

UNITED STATES PATENT OFFICE.

SAMUEL H. DICKERSON, OF HUDSON, MICHIGAN.

IMPROVEMENT IN EARTH-AUGERS.

Specification forming part of Letters Patent No. 100,609, dated March 8, 1870; reissue No. 5,508, dated July 29, 1873; application filed June 24, 1873.

DIVISION B.

*To all whom it may concern:*

Be it known that I, SAMUEL H. DICKERSON, of Hudson, in the county of Lenawee and State of Michigan, have invented certain new and useful Improvements in Earth-Augers; and I do hereby declare that the following is a full, clear, and exact description thereof that will enable others skilled in the art to which it appertains to make and use the same, reference being had to the accompanying drawings and to the letters of reference marked thereon which form a part of this specification.

The nature of my invention consists in the construction of an auger for boring wells, as hereinafter more fully set forth.

The annexed drawings represent a side elevation of the auger. A represents the auger, formed of a single piece of metal, and twisted in the form substantially as shown, with its end B rounded and bent at right angles to the vertical line of the twist. C represents a tenon or stem, which may be formed on its top to allow it to be attached to a well-tube or a rod having an open end.

In operation the auger is suitably attached to a well tube or rod, and turned. As it revolves the coils surround the dirt within the same and retain it, so that the dirt is prevented from dropping out while being removed to the surface of the earth.

This auger can be used with any well-tube.

What I claim is—

The auger B, constructed as described, so as to allow the dirt to be drawn up with it, substantially as set forth.

In testimony that I claim the foregoing I have hereunto set my hand this 16th day of June, 1873.

SAMUEL H. DICKERSON.

Witnesses:
BYRON H. SAWYER,
T. W. TOLECHARD.